United States Patent
Nakajima

[11] Patent Number: 6,064,936
[45] Date of Patent: May 16, 2000

[54] TIRE AIR PRESSURE REDUCTION DETECTING APPARATUS

[75] Inventor: Yoshio Nakajima, Itami, Japan

[73] Assignees: Sumitomo Electric Industries, Ltd., Osaka; Sumitomo Rubber Industries, Ltd., Hyogo, both of Japan

[21] Appl. No.: 09/048,229

[22] Filed: Mar. 26, 1998

[30] Foreign Application Priority Data

Apr. 14, 1997 [JP] Japan ................................. 9-095744

[51] Int. Cl.[7] .................................................. B60C 23/00
[52] U.S. Cl. ............................ 701/71; 701/74; 340/442; 73/146.2
[58] Field of Search ................................ 701/70, 71, 74; 340/442, 444, 445; 73/146.2, 146.5, 146.3

[56] References Cited

U.S. PATENT DOCUMENTS

| | | | |
|---|---|---|---|
| 5,218,862 | 6/1993 | Hurrell, II et al. | 73/146.5 |
| 5,239,469 | 8/1993 | Walker et al. | 701/29 |
| 5,345,741 | 9/1994 | Nishihara et al. | 73/146.2 |

FOREIGN PATENT DOCUMENTS

| | | |
|---|---|---|
| 63-305011 | 12/1988 | Japan . |
| 6-92116 | 4/1994 | Japan . |
| 6-183227 | 7/1994 | Japan . |
| 7-156621 | 6/1995 | Japan . |

*Primary Examiner*—Tan Nguyen
*Attorney, Agent, or Firm*—Rabin & Champagne, P.C.

[57] ABSTRACT

The present invention provides a tire air pressure reduction detecting apparatus arranged such that both an ABS processing and an air pressure reduction judgment processing can be executed with a single microcomputer. A vacant period of time $t_n$ for timing waiting is prepared in each ABS cycle. Utilizing such vacant periods of time $t_n$, an air pressure reduction Judgment processing is dispersively executed in a time-division manner in a plurality of such vacant periods of time $t_n$ (FIG. 4).

7 Claims, 9 Drawing Sheets

TIRE AIR PRESSURE REDUCTION DETECTING APPARATUS

FIELD OF THE INVENTION

The present invention relates to a tire air pressure reduction detecting apparatus to be suitably mounted on a four-wheel motor vehicle together with an antilock braking system (ABS) for preventing any of the four wheels mounted on the motor vehicle from being locked.

DESCRIPTION OF THE RELATED ART

As one of safety means for a four-wheel motor vehicle such as a passenger car, truck or the like, an apparatus for detecting a reduction in tire air pressure has been developed.

A tire air pressure reduction detecting apparatus is arranged to detect a rotational angular velocity of each tire and to detect, based on the rotational angular velocity of each tire, a tire relatively reduced in air pressure (For example, Japanese Patent Laid-Open Publication No. 63-305011).

Such a tire air pressure reduction detecting apparatus of prior art is arranged such that the respective rotational angular velocities of the four tires are obtained using wheel rotational velocity sensors for detecting the rotational states of the four tires, respectively, that an average value of the rotational angular velocities of one pair of diagonally disposed tires is subtracted from an average value of the rotational angular velocities of another pair of diagonally disposed tires, and that when the difference thus obtained is for example greater than 0.05% of the average value of the rotational angular velocities of the four tires, it is judged that there is a tire reduced in air pressure.

On the other hand, for safety driving of a motor vehicle, an ABS (Antilock Braking System) is used and now spreads rapidly. This ABS is a system which comprises wheel rotational velocity sensors for detecting the rotational states of the four tires, respectively, and which is arranged to detect whether or not each tire is in a slip state of idle running, thereby to control the braking hydraulic pressure.

Thus, since both the tire air pressure reduction detecting apparatus (hereinafter referred to as DWS) and the ABS utilize wheel rotational velocity sensors, it is proposed that the DWS shares the wheel rotational velocity sensors with the ABS.

When the wheel rotational velocity sensors are commonly used, detection signals of the four wheel rotational velocity sensors are shaped through a binarization circuit and then supplied to an ABS microcomputer and a DWS microcomputer. Each of the two microcomputers executes a specific processing according to the task thereof (See Japanese Patent Laid-Open Publication No. 6-92116).

However, the use of two microcomputers not only increases the number of component elements to increase the apparatus in size, but also limits the degree of freedom in pattern designing of a printed circuit board to lower the productivity in designing work.

DISCLOSURE OF THE INVENTION

It is an object of the present invention to provide a tire air pressure reduction detecting apparatus to be mounted, together with an ABS, on a motor vehicle such that both an ABS processing and a tire air pressure reduction judgment processing can be executed with a single microcomputer.

To achieve the object above-mentioned, a tire air pressure reduction detecting apparatus according to the present invention comprises: ABS processing means for executing, in each ABS cycle, an ABS processing for preventing each tire from being locked, each ABS cycle including (i) an ABS processing period of time during which an ABS processing is actually executed, and (ii) a vacant period of time for timing waiting; DWS processing means for executing an air pressure reduction judgment processing for judging whether or not each tire is reduced in air pressure; and processing control means arranged such that an air pressure reduction judgment processing to be executed by the DWS processing means is dispersively executed in vacant periods of time which are repeatedly generated by executing ABS processings in the ABS processing means (claim 1).

According to the present invention, an air pressure reduction judgment processing is dispersively executed utilizing vacant periods of time in ABS processings. Accordingly, when an ABS and the tire air pressure reduction detecting apparatus are mounted on a motor vehicle for example, an ABS processing and an air pressure reduction judgment processing can be executed with a single microcomputer. For example, there are instances where the tire air pressure reduction detecting apparatus is later added to a motor vehicle previously equipped with an ABS. In such cases, by merely changing the program, an air pressure reduction judgment processing can be executed with the ABS microcomputer disposed at the ABS. Thus, since an originally disposed microcomputer can effectively be utilized, the tire air pressure reduction detecting apparatus can be economically assembled with an ABS in a simple arrangement.

Preferably, the tire air pressure reduction detecting apparatus comprises signal output means for supplying an interrupt signal per ABS cycle. In such an arrangement, the processing control means preferably comprises: means for recognizing the start timing of each vacant period of time; means for executing, in response to recognition of the start timing of each vacant period of time, an air pressure reduction judgment processing in the DWS processing means; and means arranged such that, in response to output of an interrupt signal from the signal output means, an air pressure reduction judgment processing under execution in the DWS processing means is temporarily interrupted and an ABS processing is executed in the ABS processing means (claim 2).

Preferably, the tire air pressure reduction detecting apparatus further comprises: initial check processing means for executing an initial check processing for judging whether or not the apparatus functions normally; and means for inhibiting the execution of an air pressure reduction judgment processing by the DWS processing means during the time when an initial check processing is being executed by the initial check processing means (claim 3).

According to this feature of the invention, while an initial check processing is being executed, an air pressure reduction judgment processing is not executed. This prevents the occurrence of a mistake about judgment of whether or not a tire is reduced in air pressure. More specifically, it is unknown whether or not the hardware structure for acquiring each wheel rotational velocity pulse necessary for executing an air pressure reduction judgment processing normally functions while the execution of an initial check processing is under way, and therefore, this involves the likelihood that each wheel rotational velocity pulse acquired during the execution of an initial check processing, contains errors. Thus, the tire air pressure reduction detecting apparatus of the present invention is high in precision.

It is preferable that the tire air pressure reduction detecting apparatus further comprises memory checking means for checking (i) each memory to be used by the ABS processing means for executing an ABS processing and (ii) each memory to be used by the DWS processing means for executing an air pressure reduction judgment processing, and that memory check by the memory checking means is executed according to either an ABS processing program or an air-pressure-reduction-judgment-processing program (claim 4).

According to this feature of the invention, each memory to be used by the ABS processing means for an ABS processing and each memory to be used by the DWS processing means for an air pressure reduction judgment processing are checked according to either the ABS-processing program or the air-pressure-reduction-judgment-processing program. Accordingly, a trouble of each memory to be used for an ABS processing can be detected using the air-pressure-reduction-judgment-processing program, and a trouble of each memory to be used for an air pressure reduction judgment processing can be detected using the ABS processing program. This saves the calculation resources. Examples of the memory includes a ROM, a RAM and a nonvolatile memory.

The tire air pressure reduction detecting apparatus may be arranged such that an ABS alarm lamp and/or a DWS alarm lamp is lit when it is detected that a memory is defective (claim 5).

When a memory trouble is detected, the ABS alarm lamp and/or the DWS alarm lamp is lit. Accordingly, the part in trouble can be informed to the user in an understandable manner.

Preferably, the tire air pressure reduction detecting apparatus is arranged such that the ABS processing means and the DWS processing means share both the memories to be used by the ABS processing means for an ABS processing and the memories to be used by the DWS processing means for an air pressure reduction judgment processing, and are arranged to respectively execute an ABS processing and an air pressure reduction judgment processing (claim 6).

According to this feature of the invention, the ABS processing means and the DWS processing means share a memory to respectively execute an ABS processing and an air pressure reduction judgment processing. This simplifies the arrangement as compared with a case in which processing means are respectively provided with the necessary memories. For example, when the tire air pressure reduction detecting apparatus is later added to a motor vehicle previously equipped with an ABS, the memories of the ABS can also be utilized for an air pressure reduction judgment processing. Thus, the tire air pressure reduction detecting apparatus can be more economically assembled with an ABS in a more simplified arrangement.

Preferably, the tire air pressure reduction detecting apparatus further comprises a plurality of pulse acquiring means each of which is arranged to acquire a wheel rotational velocity pulse corresponding to the rotational angular velocity of each tire mounted on the motor vehicle. In such an arrangement, the ABS processing means preferably comprises: a plurality of means each of which is arranged to count, in each ABS cycle, the pulse number of a wheel rotational velocity pulse acquired by each pulse acquiring means; a plurality of means each of which is arranged to obtain, for each tire, a pulse interval between pulse-number-counting starting time and pulse-number-counting ending time; a plurality of means each of which is arranged to obtain a rotational angular velocity of each tire based on the pulse number counted in the previous ABS cycle and on the pulse interval obtained in the previous ABS cycle; and means for executing, for the tires, an ABS processing based on the rotational angular velocities thus obtained, and the DWS processing means preferably comprises: a plurality of means each of which is arranged to totalize, throughout each DWS cycle, (i) the pulse numbers counted, for each tire, by the ABS processing means and (ii) the pulse intervals obtained, for each tire, by the ABS processing means; a plurality of means each of which is arranged to obtain a rotational angular velocity of each tire based on the pulse number totalized throughout the previous DWS cycle and on the pulse interval totalized throughout the previous DWS cycle; and means for executing, for the tires, an air pressure reduction judgment processing based on the rotational angular velocities thus obtained. (claim 7).

According to the arrangement above-mentioned, in the DWS processing means, the rotational angular velocities of the tires can be obtained with the use of the pulse numbers and pulse intervals obtained by the ABS processing means. This simplifies the processings as compared with an arrangement in which the rotational angular velocities are obtained with the use of wheel rotational velocity pulses obtained by the pulse acquiring means in each of the processing means.

BEST MODES FOR CARRYING OUT THE INVENTION

The following description will discuss in detail embodiments of the present invention with reference to the attached drawings.

Figure 1:
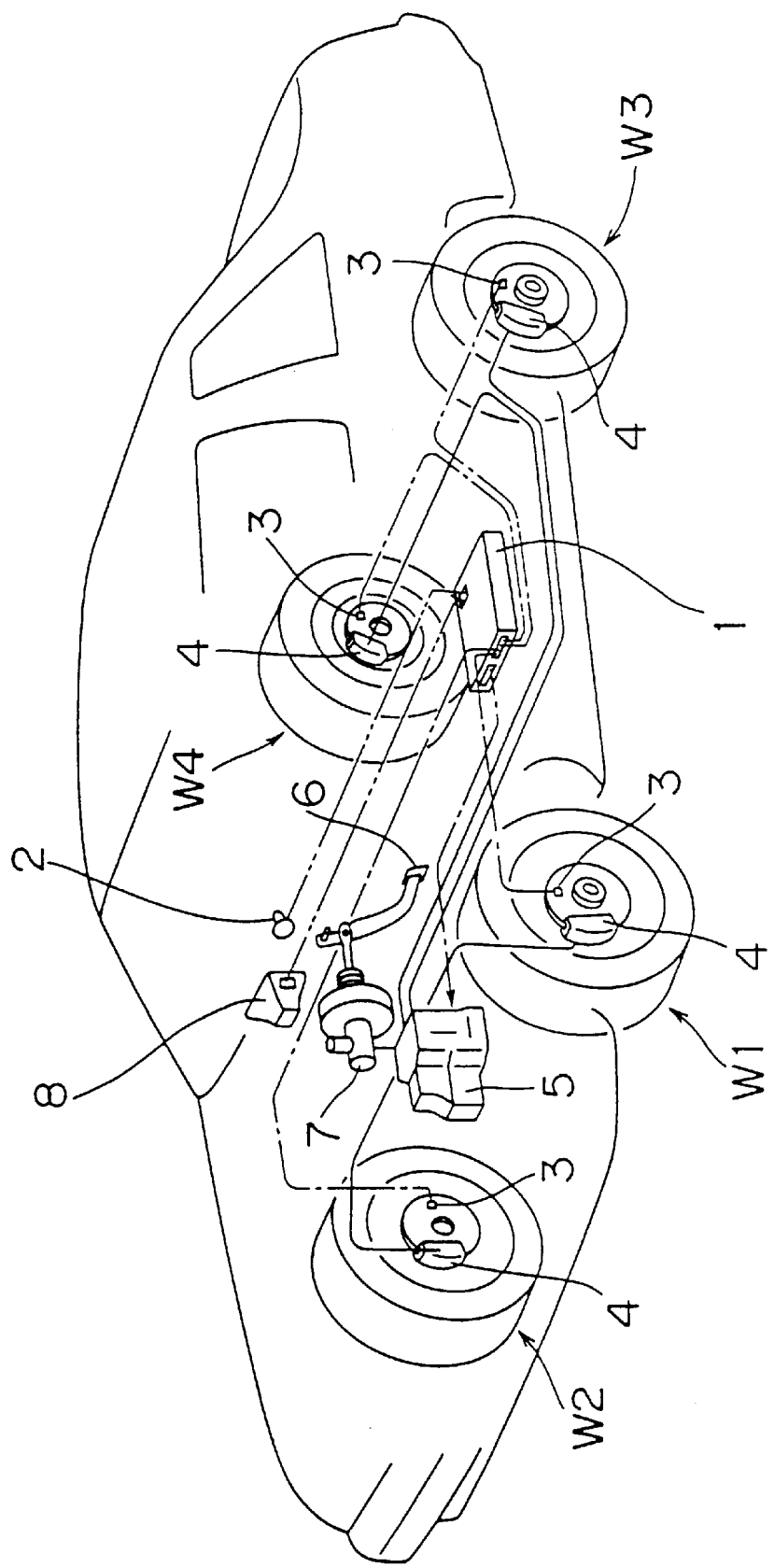
FIG. 1 is a schematic view illustrating a motor vehicle on which mounted is a tire air pressure reduction detecting apparatus according to an embodiment of the present invention.

FIG. 1 is a schematic view of a motor vehicle on which mounted is a tire air pressure reduction detecting apparatus according to an embodiment of the present invention. This tire air pressure reduction detecting apparatus has an air pressure reduction judgment function for judging whether or not each of the four tires $W_1$, $W_2$, $W_3$, $W_4$ of the motor vehicle is reduced in air pressure, and an ABS function of preventing a tire $W_i$ (i=1, 2, 3, 4) from being locked due to sudden brakes or the like. The tires $W_1$ and $W_2$ correspond to the front left and right tires, respectively, and the tires $W_3$ and $W_4$ correspond to the rear left and right tires, respectively.

The tire air pressure reduction detecting apparatus has a control unit 1 serving as the control center of the apparatus. The control unit 1 is connected to an initializing switch 2 to be operated by the driver for obtaining each initial correction coefficient required for an initial correction processing contained in the air pressure reduction judgment function. The initial correction processing is arranged to exclude variations (initial differences) in effective rolling radius of the tires, the variations being within the standards (Japanese Patent Laid-Open Publications No. 7-156621 and No. 6-183227). The effective rolling radius is defined as a value obtained by dividing, by $2\pi$, the distance that a tire $W_i$ has traveled during one revolution under free rolling with a load being applied.

Each wheel rotational velocity sensor 3 disposed in association with each tire $W_i$ supplies a sine wave to the control unit 1. When an output of each wheel rotational velocity sensor 3 is given to the control unit 1, the control unit 1 binarizes the output to form a wheel rotational velocity pulse. Further, the control unit 1 executes, based on each wheel rotational velocity pulse thus formed, an ABS processing and a tire air pressure reduction judgment processing (hereinafter referred to as DWS processing).

In an ABS processing, there is obtained the rotational angular velocity $F_i$ of each tire $W_i$ based on its wheel rotational velocity pulse. Based on the rotational angular velocity Fi thus obtained, there are obtained the velocity $V_i$ of each tire $W_i$ and the velocity V of the motor vehicle. Then, there is obtained a slip ratio Rs which is the ratio or difference between the velocity $V_i$ of each tire $W_i$ and the velocity V of the motor vehicle. Based on each slip ratio Rs thus obtained, it is judged whether or not each tire $W_i$ is about to be locked. According to this judgment result, there is controlled the braking hydraulic pressure to be transferred to the brake 4 disposed in association with each tire $W_i$. More specifically, the control unit 1 controls the braking hydraulic pressure by controlling a hydraulic pressure unit 5, which is arranged to control a braking hydraulic pressure generated in a master cylinder 7 when a braking pedal 6 is pressed.

In a DWS processing, there is obtained the rotational angular velocity Fi of each tire $W_i$ based on its wheel rotational velocity pulse. A judgment value is obtained based on each rotational angular velocity Fi thus obtained. Based on each judgment value, it is judged whether or not each tire $W_i$ is reduced in air pressure. When it is judged, based on each judgment value, that a tire $W_i$ is reduced in air pressure, the judgment result is displayed on a display 8.

Figure 2:
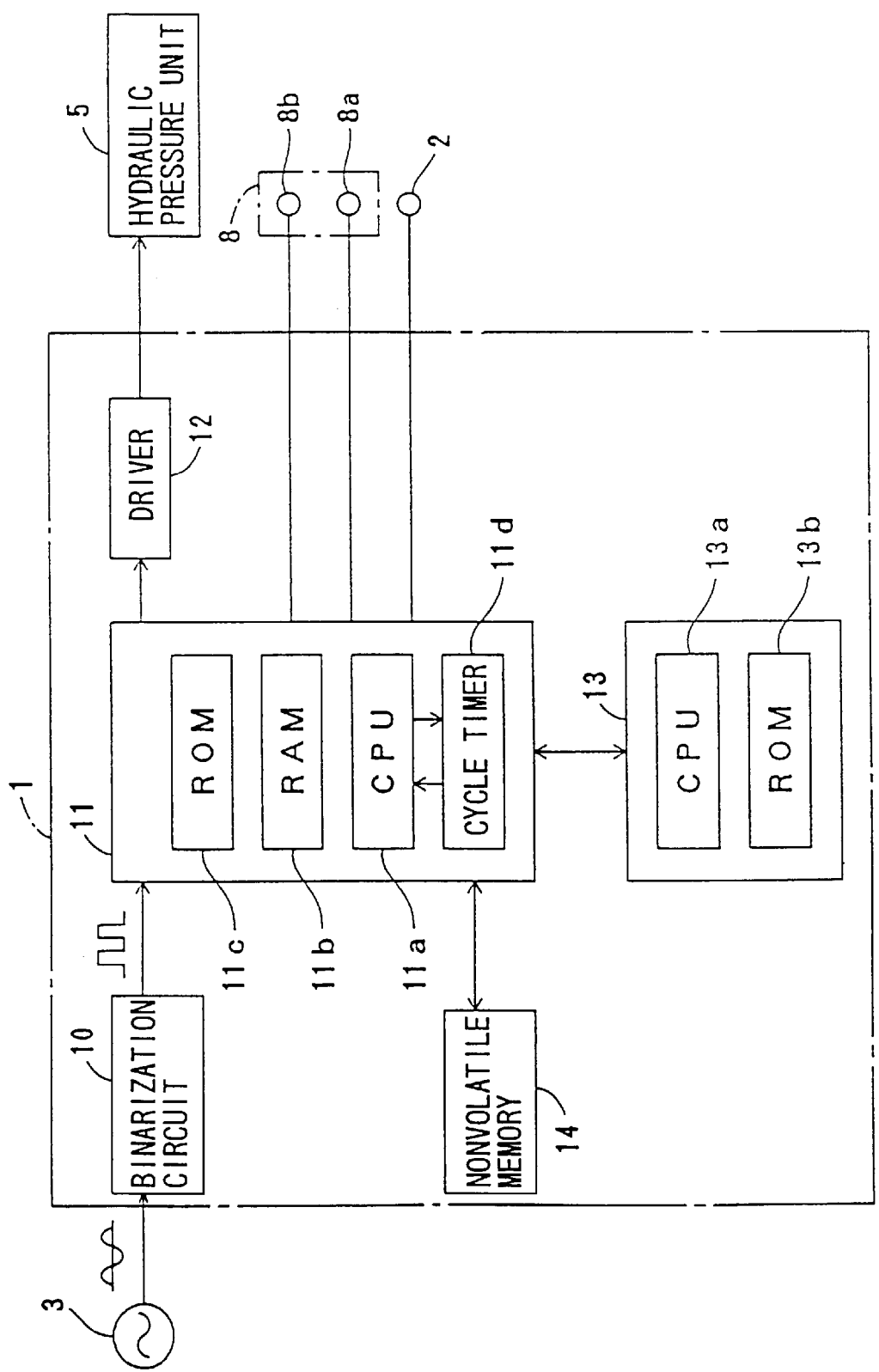
FIG. 2 is a block diagram illustrating the electric arrangement of the tire air pressure reduction detecting apparatus according to the embodiment of the present invention.

FIG. 2 is a block diagram illustrating the electric arrangement of the tire air pressure reduction detecting apparatus. As mentioned earlier, the output of each wheel rotational velocity sensor 3 is given to the control unit 1. In a binarization circuit 10, the output of each wheel rotational velocity sensor 3 is binarized and converted into a wheel rotational velocity pulse. The wheel rotational velocity pulse of each tire $W_i$ has a pulse length in inverse proportion to its rotational angular velocity Fi, and is supplied to a controlling microcomputer 11.

The controlling microcomputer 11 comprises a CPU 11a serving as an operation processing center, a RAM 11b serving as a work area, a ROM 11c containing a variety of programs including an initial correction coefficient calculation program; an ABS processing program and a DWS processing program, and a cycle timer 11d for supplying an interrupt signal to the CPU 11a each time a predetermined interrupt period of time $t_{TH}$ has passed.

When an ignition key switch is turned on, the CPU 11a executes, according to either the ABS processing program or the DWS processing program stored in the ROM 11c, a memory check processing on each of the ROM 11c, the RAM 11b and a nonvolatile memory 14 which is to be discussed later. According to the ABS processing program and the DWS processing program stored in the ROM 11c, the CPU 11a executes, in a manner of time division which is to be discussed later, ABS and DWS processings with the use of an interrupt signal supplied from the cycle timer 11d.

Based on the result of execution of an ABS processing, the CPU 11a drives a driver 12 and controls the hydraulic pressure unit 5. This prevents each tire $W_i$ from being locked even though brakes are suddenly applied.

On the other hand, when it is judged as a result of execution of a DWS processing that there is a tire $W_i$ reduced in air pressure, the CPU 11a operates to light a DWS monitoring lamp 8a of the display 8, thus informing the driver that there is a tire $W_i$ reduced in air pressure.

The control unit 1 also has a monitoring microcomputer 13. The monitoring microcomputer 13 comprises a CPU 13a serving as an operation processing center, and a ROM 13b containing a monitoring program for an ABS monitoring processing.

When the ignition key switch is turned on, the CPU 13a reads the monitoring program stored in the ROM 13b and monitors, according to this monitoring program, the processings executed by the controlling microcomputer 11. More specifically, the CPU 13a monitors whether or not the control of the hydraulic pressure unit 5 by the controlling microcomputer 11 takes abnormally long time, whether or not the controlling microcomputer 11 works properly as to the operational function, or the like. When an abnormality is detected in any of the processings executed by the controlling microcomputer 11, the CPU 13a operates to light an ABS monitoring lamp 8b, thus informing the driver the occurrence of abnormality.

If a trouble is detected in a memory according to the ABS processing program or the DWS processing program, the CPU 13a operates to light the ABS monitoring lamp 8b and/or the DWS monitoring lamp 8a, thus informing the driver the occurrence of abnormality. When it is arranged such that a monitoring lamp to be lit is switched dependent on the part in trouble, the driver can recognize which system is abnormal and which system is normal. When one unit (for example, the DWS unit) is apparently housed in the other unit (for example, the ABS unit), it is sufficient to arrange such that only the monitoring lamp for the other (ABS) unit is to be lit regardless of a trouble part. A service personnel may check and/or replace the ABS unit for which the monitoring lamp is lit.

The control unit 1 further has the nonvolatile memory 14 formed of an EEPROM or the like. The nonvolatile memory 14 contains fixed data required for execution of a DWS processing. More specifically, the nonvolatile memory 14 contains correction coefficients to be used in a cornering correction processing included in the DWS processing for excluding, from judgment values, errors generated at the time of cornering.

In the nonvolatile memory 14, variable data required for executing DWS and ABS processings are written as necessary. The variable data for a DWS processing include initial correction coefficients. Each initial correction coefficient corresponds to the ratio of the effective rolling radius of each tire $W_i$ to the effective rolling radius of an optional tire $W_i$ having a normal inner pressure serving as a reference tire.

Initial correction coefficients are obtained by operating the initializing switch 2 by the driver for example when a tire $W_i$ is replaced. More specifically, when all the tires of a motor vehicle are normal in inner air pressure, the driver runs the motor vehicle straight and operates the initializing switch 2. In response to this, the CPU 11a reads the initial correction coefficient calculation program from the ROM 11c, and executes operations according to this program. That is, the rotational angular velocity Fi of each tire $W_i$ is obtained according to the wheel rotational velocity pulse, and there is obtained the ratio of the rotational angular velocity Fi of each tire $W_i$ to the rotational angular velocity Fi of a tire $W_i$ serving as a reference tire. For each tire $W_i$ except for the reference tire, a plurality of such ratios of rotational angular velocity Fi are obtained in a predetermined period of time and the average is then obtained. This average serves as the initial correction coefficient of each tire $W_i$ and is written in the nonvolatile memory 14 at a predetermined region thereof.

To calculate each initial correction coefficient, a plurality of ratios of rotational angular velocity Fi are required. This takes much time before the calculation is completed. Accordingly, the CPU 11a is arranged to write, one by one, the data under calculation for initial correction coefficient. Accordingly, even though the power supply is turned off in the course of calculation, the calculation can be later continued.

The variable data in the ABS processing include trouble codes, each of which represents a defective place if the controlling microcomputer 11, the ABS actuator such as the hydraulic pressure unit 5, or the like becomes defective. A judgment of whether or not a component element is defective is made for example based on observation on the controlling microcomputer 11 by the monitoring microcomputer 13.

Figure 3:
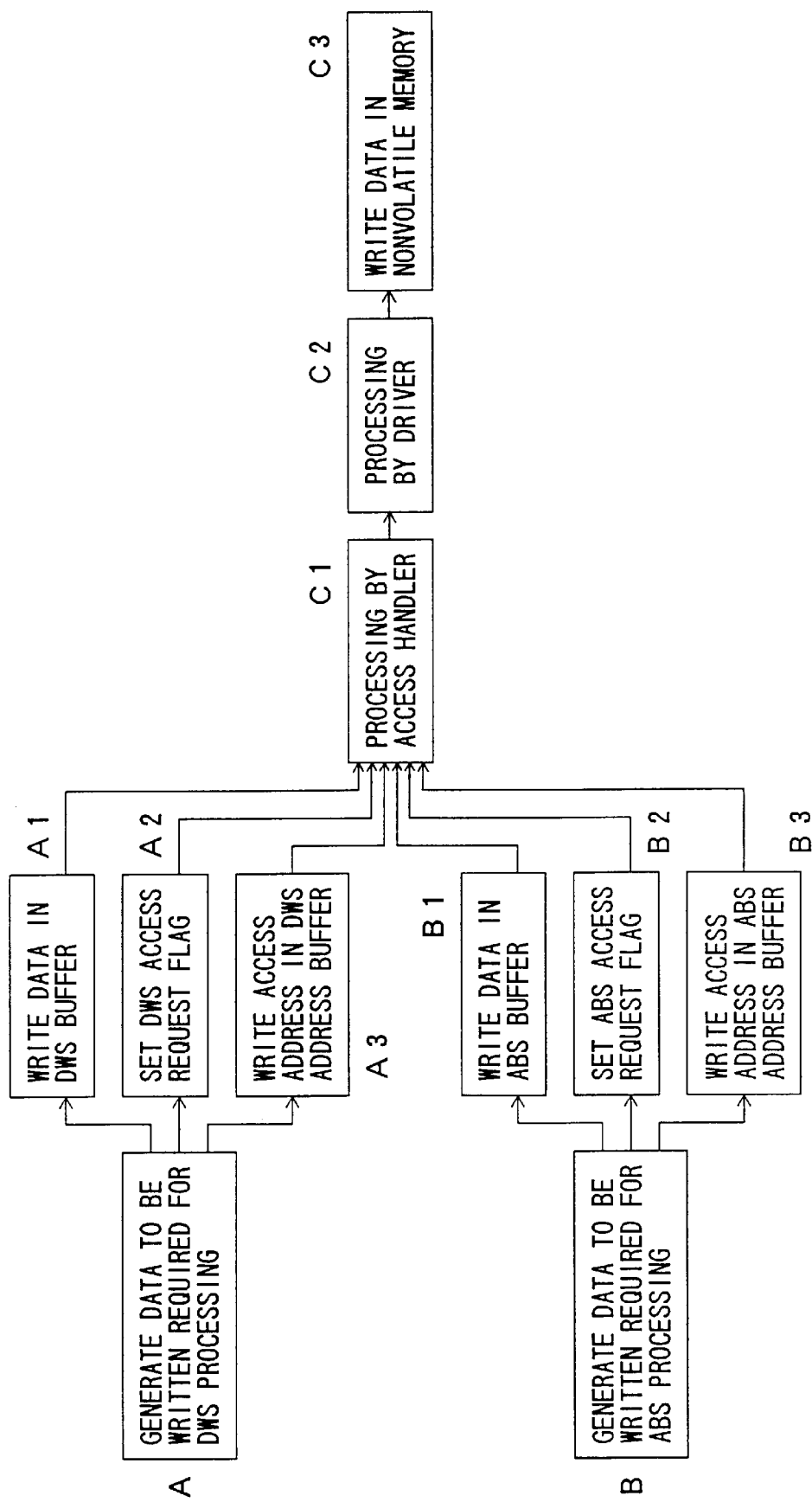
FIG. 3 is a view for illustrating how a data is written in a nonvolatile memory.

FIG. 3 is a view for illustrating how a data is written in the nonvolatile memory. When there is generated a data to be written such as an initial correction coefficient or the like required for a DWS processing (A), the CPU 11a once writes such data in a DWS buffer therein (A1). At this time, a DWS access request flag in the CPU 11a is set (A2). This represents that there is a data to be written in the nonvolatile memory 14. Then, an access address serving as the address of the nonvolatile memory 14 into which the data are to be written, is written in a DWS address buffer in the CPU 11a (A3).

Then, the CPU 11a judges, according to an access handler which is a low-ranking program, whether or not the DWS access request flag has been set (C1). If it is judged that the DWS access request flag has been set, it is judged that there is a data to be written, and then, the data and the access address are then processed according to a driver serving as a high-ranking program (C2). The data is then written in the nonvolatile memory 14 at its address region designated by the access address (C3).

When there is generated a data to be written such as a trouble code or the like required for an ABS processing (B), the CPU 11a once writes the data in an ABS buffer (B1), sets an ABS access request flag (B2) and writes an access address in an ABS address buffer (B3). Then, the CPU 11a executes an access handler and a driver (C1, C2), and writes the data in the nonvolatile memory 14 at its address region designated by the access address (C3).

According to the tire air pressure reduction detecting apparatus having the arrangement above-mentioned, the nonvolatile memory 14 is commonly used in both ABS and DWS processings. This enables both ABS and DWS processings to be executed with a simple arrangement.

Figure 4:
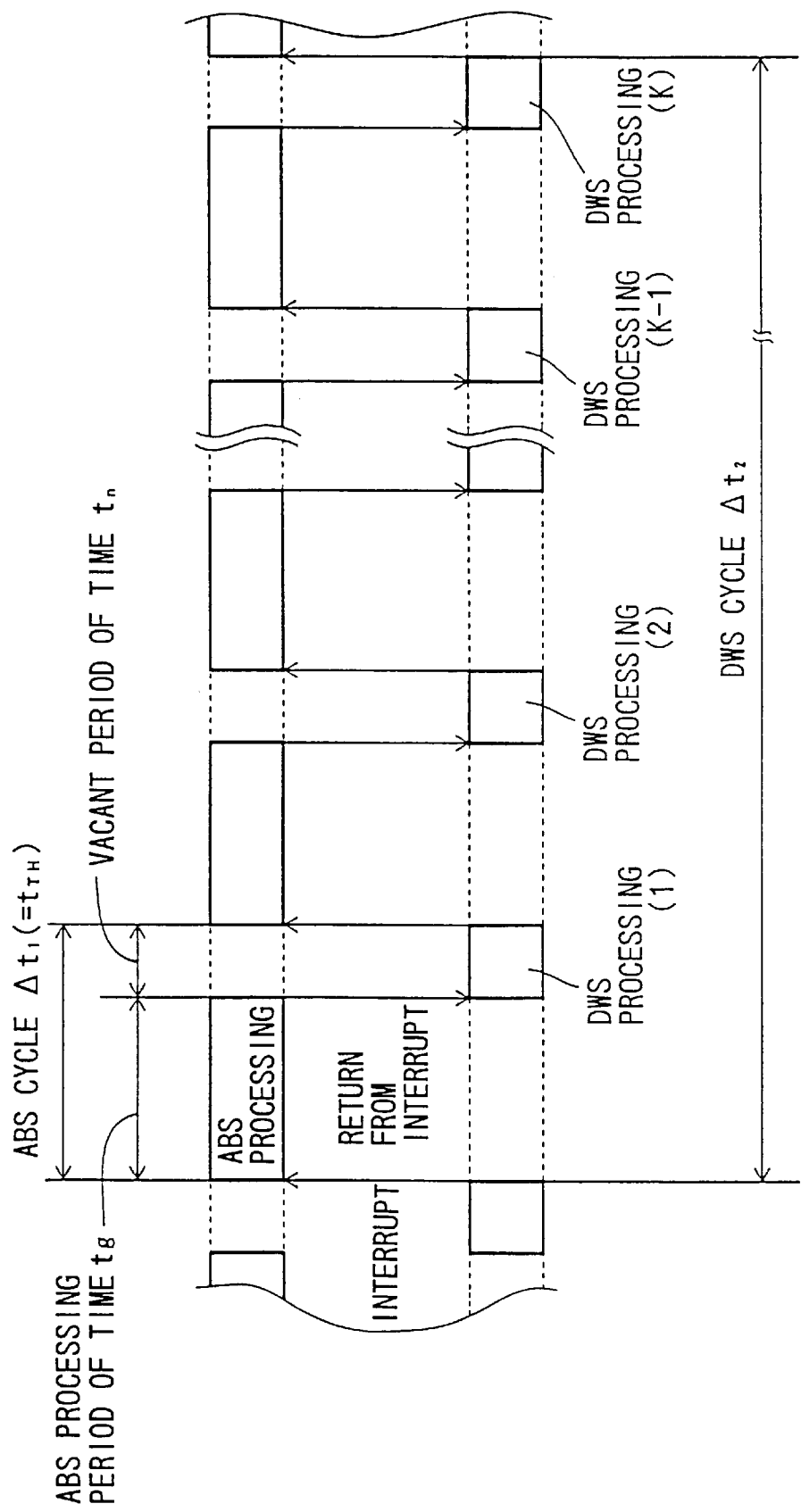
FIG. 4 is a view for illustrating how ABS processings and a DWS processing are controlled in timing.

FIG. 4 is a view for illustrating how ABS and DWS processings are controlled in timing. Each ABS processing is to be executed in one cycle of a predetermined ABS cycle $\Delta t_1$ (for example, $\Delta t_1 = 10$ msec). In fact, however, an operational processing is not executed throughout the ABS cycle $\Delta t_1$. That is, an operational processing is to be executed only for a first ABS processing period of time $t_g$ (for example, $t_g = 8$ msec), and the remaining vacant period of time $t_n$ (for example, $t_n = 2$ msec) is reserved as a timing waiting period of time. This embodiment is arranged such that a DWS processing is executed in vacant periods of time $t_n$ in ABS processings.

The minimum required period of time for executing a DWS processing (real execution period of time), is longer than the vacant period of time $t_n$ of each ABS processing. Therefore, an entire DWS processing cannot be completed within a single vacant period of time $t_n$. More specifically, a DWS processing in general is to be executed in one cycle of a DWS cycle $\Delta t_2$ (for example, $\Delta t_2 = 1$ sec) longer than the ABS cycle $\Delta t_1$. The real execution period of time of a DWS processing is merely dozens % out of the DWS cycle $\Delta t_2$, and more specifically about 200 msec.

Thus, this embodiment is arranged such that a DWS processing is not executed in a single vacant period of time $t_n$ but is dispersively executed in a plurality of vacant periods of time $t_n$ in which a DWS processing portion (1), a DWS processing portion (2), ..., a DWS processing portion (k−1) and a DWS processing portion (k) are respectively executed.

To achieve such control, a priority is given to an ABS processing than a DWS processing. More specifically, provision is made such that an ABS processing of a high priority interrupts a DWS processing of a low priority at the end timing of the vacant period of time $t_n$ in which the DWS processing is being executed, and that the sequence is returned to the DWS processing at the start timing of the subsequent vacant period of time $t_n$ at which the ABS processing period of time $t_g$ is ended.

According to this embodiment, to achieve such an interrupt by an ABS processing, the interrupt period of time $t_{TH}$ of a cycle timer 2e is set to a value equal to the ABS cycle $\Delta t_1$, and provision is made such that the measurement start timing of the cycle timer 2e is in synchronism with the start timing of the ABS cycle $\Delta t_1$.

Figure 5:
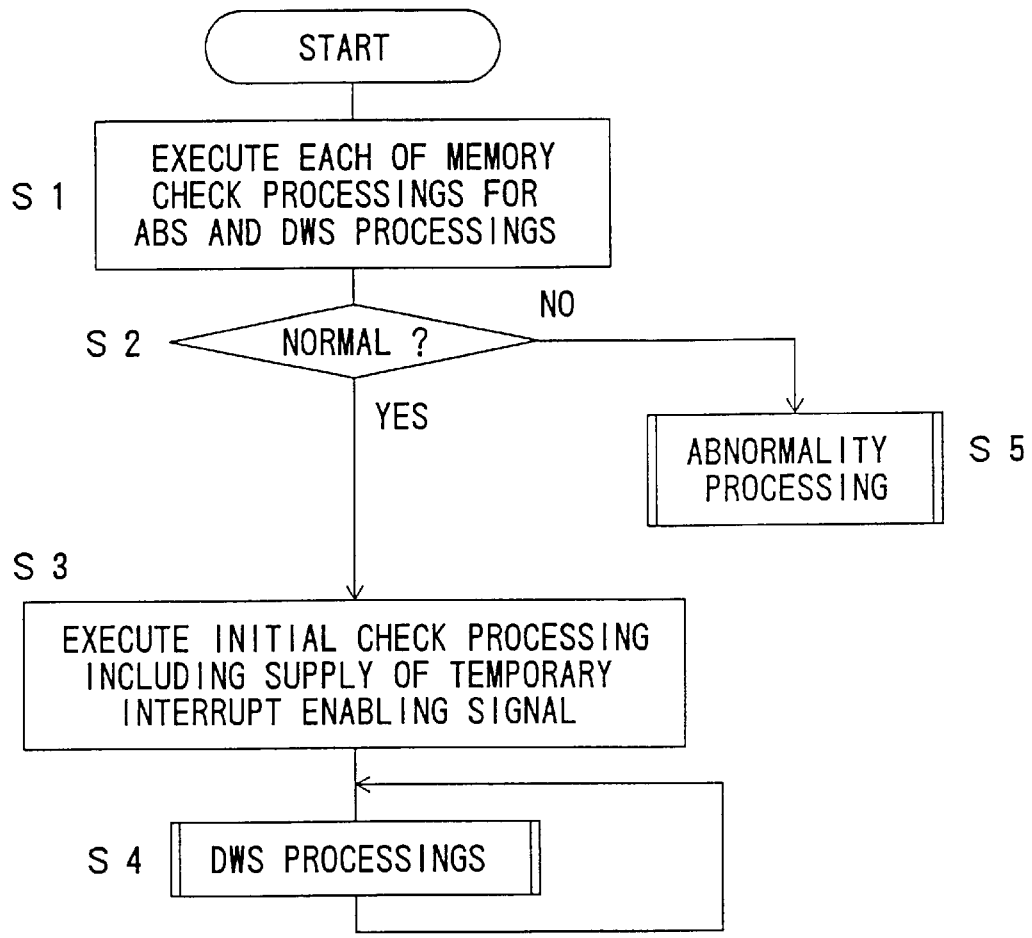
FIG. 5 is a flow chart for illustrating, more specifically, how an ABS processing and a DWS processing are controlled in timing.
Figure 6:
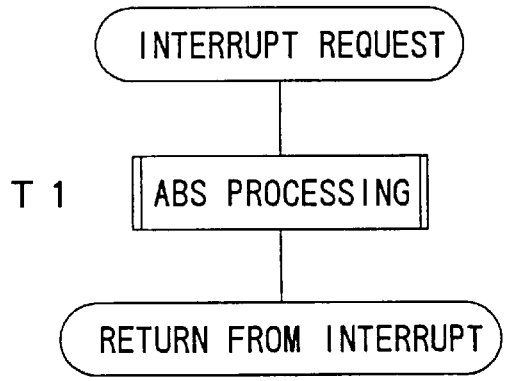
FIG. 6 is also a flow chart for illustrating, more specifically, how an ABS processing and a DWS processing are controlled in timing.

FIGS. 5 and 6 are flow charts for more specifically illustrating how a memory check processing, an ABS processing and a DWS processing are controlled in timing. When the ignition key switch is turned on to start the tire air pressure reduction detecting apparatus, the CPU 11a reads out the ABS processing program or the DWS processing program stored in the ROM 11c. According to the ABS or DWS processing program thus read, the CPU 11a executes each of the memory check processings for ABS and DWS processings (step S1).

How to check a memory is known, but a brief description will be made in the following with reference to FIGS. 7, 8 and 9.

Figure 7:
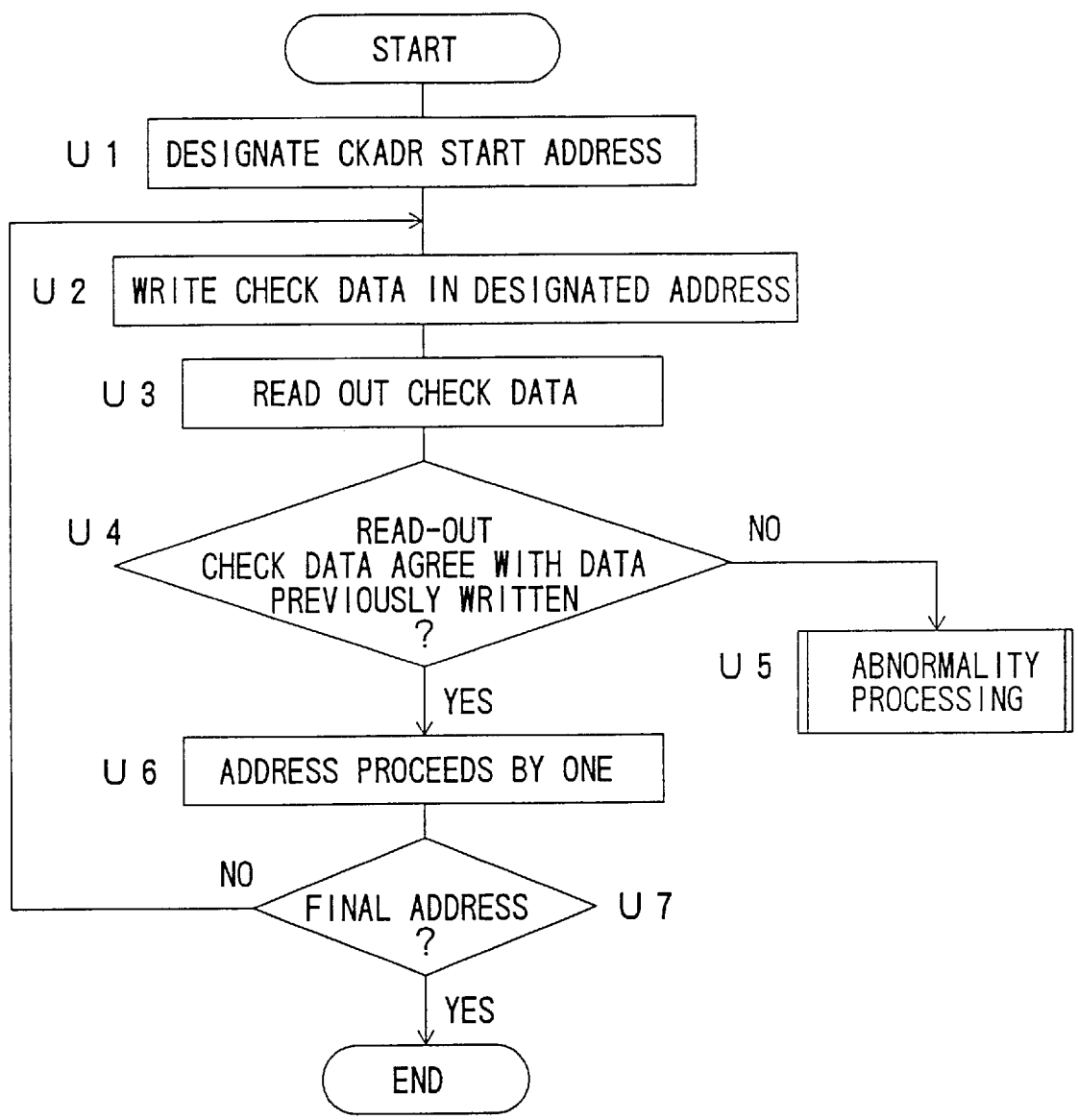
FIG. 7 is a flow chart for illustrating how a RAM is checked.

FIG. 7 is a flow chart for illustrating how to check the RAM. The address region of a memory to be checked is defined as CKADR. At a step U1, the CKADR start address is designated. Then, a check data is written in the address thus designated (step U2). The check data is one of $00_H$, $55_H$, $AA_H$ and the lowest byte of CKADR. The written check data is read out (step U3) and compared with a check data previously written (step U4). If the read check data does not agree with the check data previously written, an abnormality processing is executed (step U5). If both data agree with each other, the address proceeds by one (step U6). The processings above-mentioned are repeated until the final address (step U7).

Figure 8:
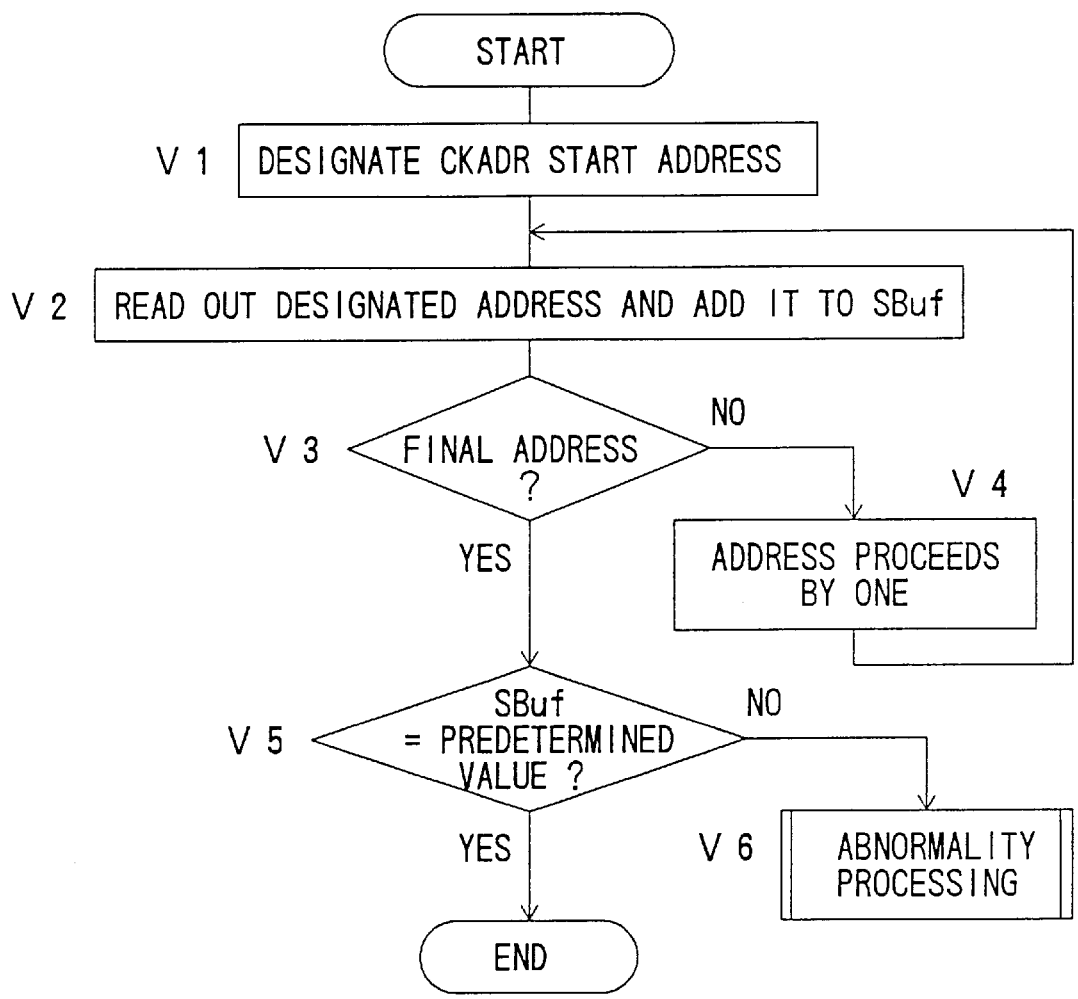
FIG. 8 is a flow chart for illustrating how a ROM is checked.

FIG. 8 is a flow chart for illustrating how to check a ROM. The CKADR start address is designated (step V1), and the data at the start address is read out and written in a working region of the CPU 11a. That is, the data is added into Sbuf (step V2). Then, the address proceeds by one (step V4) to continue data reading and data addition into the working region. At the final address, it is judged whether or not the written total value $S_{buf}$ is equal to a predetermined value (step V5). If the total value $S_{buf}$ is not equal to the predetermined value, an abnormality processing is executed (step V6).

Figure 9:
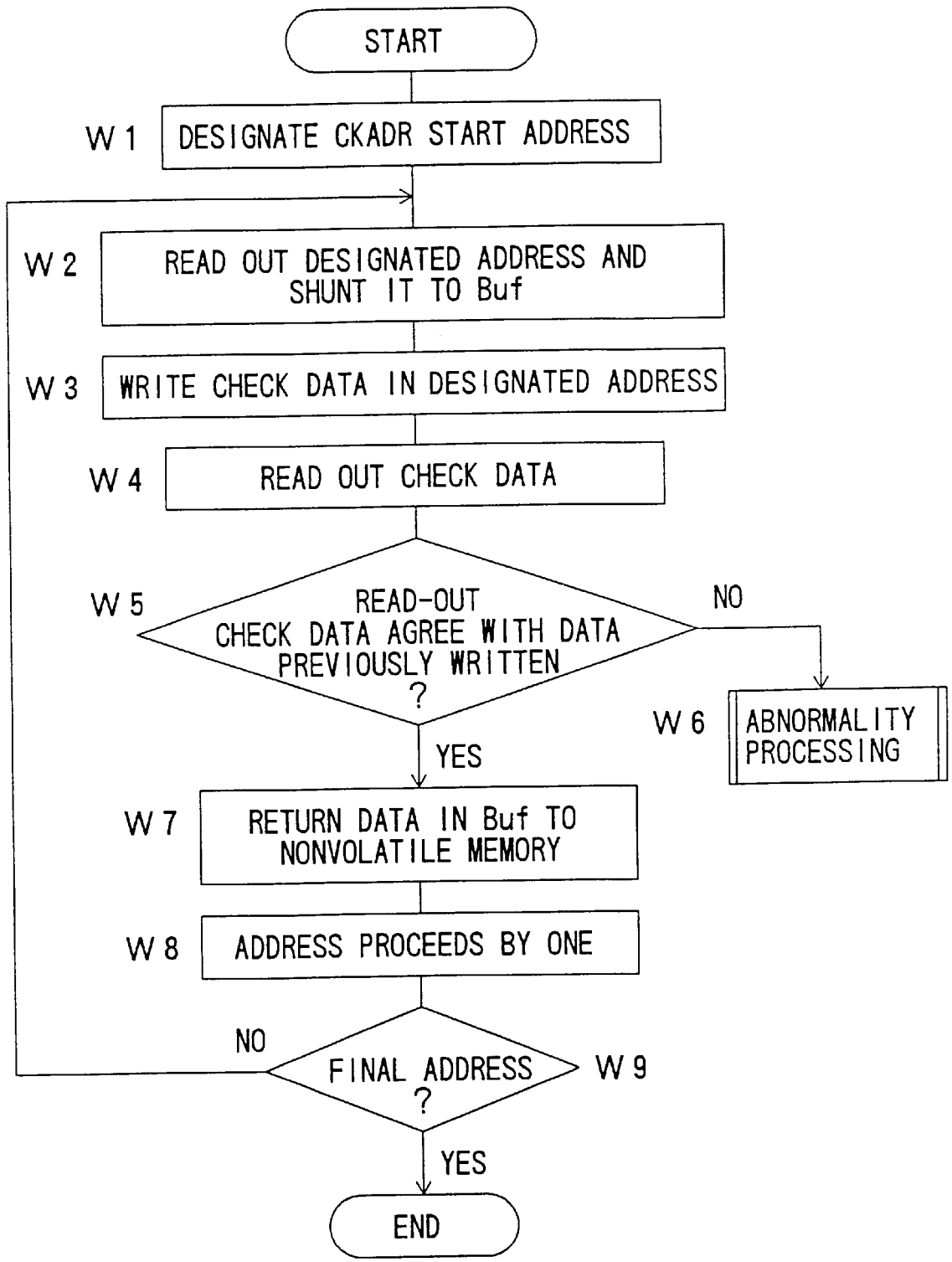
FIG. 9 is a flow chart for illustrating how the nonvolatile memory is checked.

FIG. 9 is a flow chart for illustrating a method of checking the nonvolatile memory 14. The CKADR start address is designated (step W1), and the data at this address is read out and shunted to a buffer in the working region of the CPU 11a (step W2). A check data is written at this address (step W3). The written check data is read out (step W4) and compared with a data previously written (step W5). If the read check data does not agree with the data previously written, an abnormality processing is executed (step W6). If both data agree with each other, the data in the buffer is returned to the nonvolatile memory 14 (step W7) and then the address proceeds by one (step W8). The processings above-mentioned are repeated until the final address is reached (step W9).

Interrupting the ABS or DWS processing to be subsequently executed, the abnormality processing is executed with the ABS monitoring lamp 8b and/or the DWS monitoring lamp 8a lit or with a monitoring lamp to be lit switched dependent on the ABS or DWS system to which CKADR belongs.

The following description will discuss the ABS and DWS processings.

The CPU 11a executes an initial check processing according to the ABS processing program (step S3). The initial check processing is arranged to judge whether or not each of the input/output devices such as the wheel rotational velocity sensors 3, the display 8 and the like is normal. When it is judged that any of the input/output devices is defective, the CPU 11a writes, into the nonvolatile memory 14, the trouble code corresponding to the defective input/output device in the above-mentioned manner.

In the course of the initial check processing, the CPU 11a starts the cycle timer 11d. As mentioned earlier, the cycle timer 11d is arranged such that a period of time equal to the ABS cycle $\Delta t_1$ is set as the interrupt period of time $t_{TH}$ and that an interrupt signal is supplied to the CPU 11a at each start timing of the ABS cycle $\Delta t_1$.

When the initial check processing is finished and it is judged that each of the input/output devices is normal, the CPU 11a executes a DWS processing of a low priority according to the DWS processing program (step S4).

Thus, since provision is made such that a DWS processing starts after the initial check processing is finished, the DWS processing can accurately be executed. As mentioned earlier, the initial check processing is a processing for judging whether or not each of the input/output devices is normal. Accordingly, this involves the likelihood that, before the initial check processing is finished, a wheel rotational velocity pulse obtained from each wheel rotational velocity sensor 3 is not accurate.

When an interrupt period of time $t_{TH}$ has passed from the timing at which the cycle timer 11d has started operating in the course of the initial check processing, the cycle timer 11d supplies an interrupt signal to the CPU 11a. When this interrupt signal is given, the CPU 11a judges that an interrupt request has been made, and then temporarily interrupts the DWS processing under execution, and executes an ABS processing according to the ABS processing program (step T1 in FIG. 6).

At the start timing of the vacant period of time $t_n$ immediately after the ABS processing has been executed throughout the ABS processing period of time $t_g$, the CPU 11a operates to return the sequence to the DWS processing temporarily interrupted earlier. Then, the interrupted DWS processing is resumed. More specifically, the ABS processing program includes an instruction of "return from the interrupt" at the end timing of an ABS processing period of time $t_g$ (the start timing of a vacant period of time $t_n$), and the CPU 11a executes the instruction such that the sequence is returned to the DWS processing.

As mentioned earlier, the cycle timer 11d supplies an interrupt signal to the CPU 11a each time the interrupt period of time $t_{TH}$ equal to the ABS cycle $\Delta t_1$ has passed. Accordingly, it is the end timing of the vacant period of time $t_n$ corresponding to the start timing of the next ABS cycle $\Delta t_1$ that the cycle timer 11d supplies the next interrupt signal to the CPU 11a after the DWS processing is resumed at the start timing of the vacant period of time $t_n$. Therefore, the DWS processing resumed simultaneously with the start timing of the vacant period of time $t_n$, is again temporarily interrupted simultaneously with the end timing of the vacant period of time $t_n$. Then, an ABS processing is executed instead of the DWS processing.

Thus, an ABS processing is executed in an ABS cycle $\Delta t_1$ each time an interrupt signal is supplied from the cycle timer 11d, and a DWS processing is dispersively executed in vacant periods of time $t_n$ in ABS cycles $\Delta t_1$.

Since a DWS processing is dispersively executed in a plurality of vacant periods of time $t_n$, each period of time allowed for the DWS processing is shorter than the DWS cycle $\Delta t_2$. For example, when it is now supposed that m ABS cycles $\Delta t_1$ are included in a DWS cycle $\Delta t_2$, the total period of time allowed for a DWS processing is equal to $m \times t_n$. More specifically, when $\Delta t_2$ is equal to 1 sec, $\Delta t_1$ is equal to 10 msec and $t_n$ is equal to 2 msec, the total period of time allowed for a DWS processing is equal to 100×2=200 msec.

As mentioned earlier, the real execution period of time of a DWS processing is dozens % out of a DWS cycle $\Delta t_2$. Accordingly, even though each period of time allowed for a DWS processing is short, the DWS processing can entirely be executed within a DWS cycle $\Delta t_2$.

In view of execution of a plurality of ABS processings during the dispersive execution of a single DWS processing, this embodiment is contrived to obtain each rotational angular velocity Fi required in each of DWS and ABS processings.

More specifically, when executing an ABS processing, the CPU 11a counts, throughout the ABS cycle $\Delta t_1$, the pulse numbers of the wheel rotational velocity pulses given from the binarization circuit 10, and also measures periods of time between pulse-number-counting starting times and pulsenumber-counting ending times (pulse intervals T). The pulse numbers N and the pulse intervals T thus obtained are held in the RAM 11b such that these data N and T will be used for obtaining rotational angular velocities F in the subsequent ABS cycle $\Delta t_1$.

Each rotational angular velocity Fi is obtained according to the following equation (1):

$$Fi = \alpha(N/T) \qquad (1)$$

wherein $\alpha$ is a coefficient to be determined based on the effective rolling radius of each tire $W_i$, the number of teeth of the rotor used in the wheel rotational velocity sensor 3 of each tire $W_i$, and the like.

When executing a DWS processing, the CPU 11a accumulates, for each tire, the pulse numbers N and the pulse intervals T held in the RAM 11b in the previous ABS processing, and calculates, for each tire, the average pulse number and the average pulse interval. These accumulation and averaging processings are executed throughout the DWS cycle $\Delta t_2$. At the next DWS cycle $\Delta t_2$, each rotational angular velocity Fi is obtained using the final average values obtained in the previous DWS cycle $\Delta t_2$. More specifically, each rotational angular velocity Fi is obtained by putting the obtained average values in the equation (1).

Thus, the pulse numbers N and pulse intervals T obtained in ABS processings are utilized in a DWS processing. This simplifies the processings as compared with an arrangement in which rotational angular velocities F are obtained independently in each of ABS and DWS processings with the use of pulse numbers N and pulse intervals T obtained independently in each of ABS and DWS processings.

The tire air pressure reduction detecting apparatus according to this embodiment is arranged to dispersively execute a DWS processing in vacant periods of time $t_n$ of ABS processings. This enables ABS and DWS processings to be executed using the single CPU 11a. For example, when the tire air pressure reduction detecting apparatus is later mounted on a motor vehicle previously equipped with an ABS, the ABS microcomputer can be used as the control center of the tire air pressure reduction detecting apparatus. This enables the tire air pressure reduction detecting apparatus to be economically assembled with the ABS in a simple arrangement.

The nonvolatile memory 14, the ROM 11c and the RAM 11b are commonly used in DWS and ABS processings. Accordingly, when the tire air pressure reduction detecting apparatus is later mounted on a motor vehicle previously equipped with an ABS, the nonvolatile memory 14 and the like for the ABS can be utilized. This enables the tire air pressure reduction detecting apparatus to be assembled with the ABS more economically in a simpler arrangement.

Further, each memory check processing for ABS and DWS processings is executed according to either one of the ABS and DWS processing programs. This saves the calculation resources. Further, provision may be made such that a monitoring lamp to be lit is switched dependent on a part in trouble, either in the ABS part or in the DWS part. When such provision is made, the driver can readily understand what is defective.

An embodiment of the present invention has thus been discussed. However, the present invention is not limited to this embodiment. The description has been made of an embodiment arranged to execute a DWS processing in vacant periods of time $t_n$ in ABS processings. However, the present invention may be arranged, for example, to execute a DWS processing in vacant periods of time in ABS monitoring processings executed in the monitoring microcomputer 13. Likewise in an ABS processing, a vacant period of time for timing waiting is present in an ABS monitoring processing. With the use of such vacant periods of time, a DWS processing is to be executed.

Figure 10:
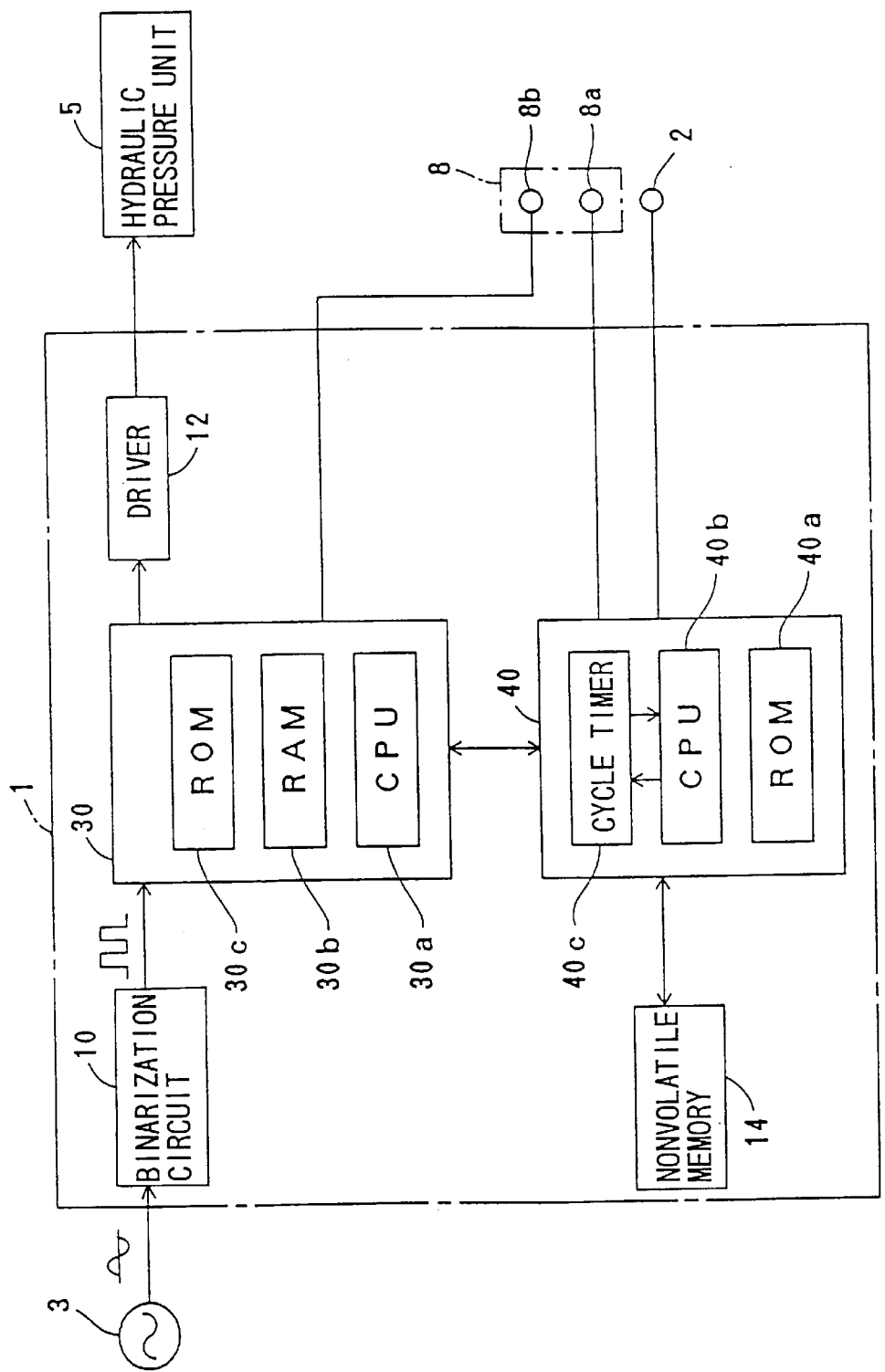
FIG. 10 is a block diagram illustrating the electric arrangement of a tire air pressure reduction detecting apparatus according to another embodiment of the present invention.

FIG. 10 shows the arrangement above-mentioned. In FIG. 10, a control unit 1 comprises: a control microcomputer 30 including a CPU 30a, a RAM 30b and a ROM 30c containing an ABS processing program; and a monitoring microcomputer 40 including a CPU 40a, a ROM 40b containing an ABS monitoring program and a DWS processing program, and a cycle timer 40c for supplying an interrupt signal to the CPU 40a each time an interrupt period of time $t_{TH}$ has passed. A nonvolatile memory 14, a DWS monitoring lamp 8a and an initializing switch 2 are connected to the monitoring microcomputer 40.

According to the arrangement above-mentioned, when the cycle timer 40c supplies an interrupt signal to the CPU 40b of the monitoring microcomputer 40 during the execution of a DWS processing, the CPU 40b gives an interrupt enabling signal to the control microcomputer 30 and temporarily interrupts the DWS processing under execution. The CPU 30a of the control microcomputer 30 executes an ABS processing in response to the interrupt enabling signal. At the end timing of an ABS processing period of time $t_g$, the CPU 30a of the control microcomputer 30 supplies, to the monitoring microcomputer 40, a signal of return to the DWS processing. In response to this signal, the monitoring microcomputer 40 resumes the DWS processing.

FIG. 10 shows the arrangement above-mentioned. According to this arrangement above-mentioned, too, a DWS processing is executed, in a time-sharing and multi-tasking manner, with the use of the monitoring microcomputer originally required for executing an ABS processing. This effectively utilizes the calculation sources. Further, provision may be made such that each memory check processing for ABS and DWS processings is executed according to either one of the ABS and DWS processing programs. With such an arrangement, the calculation sources can be saved.

Likewise the embodiment in FIG. 2, the embodiment in FIG. 10 is arranged such that pulse numbers N and pulse intervals T obtained in ABS processings are utilized for a DWS processing. In the embodiment in FIG. 10, however, the control microcomputer 30 for executing an ABS processing is disposed aside from the monitoring microcomputer 40 for executing a DWS processing. Therefore, provision may be made such that an output of the binarization circuit 10 is entered also into the monitoring microcomputer 40. With such an arrangement, pulse numbers N and pulse intervals T are obtained in each of ABS and DWS processings, and rotational angular velocities F are obtained with the use of such pulse numbers N and pulse intervals T.

Each of the embodiments above-mentioned is arranged such that the nonvolatile memory 14 is connected to the microcomputer for executing a DWS processing. However, the nonvolatile memory 14 may be connected to, for example, the microcomputer which does not execute a DWS processing. In this case, when a data to be written such as an initial correction coefficient or the like is generated, such a data is given to and once held by the microcomputer which does not execute a DWS processing, and then written into the nonvolatile memory 14.

A variety of modification in designing may be made within the scope of the invention.

What is claimed is:

1. A tire air pressure reduction detecting apparatus comprising:

ABS processing means for executing, in each ABS cycle, an ABS processing for preventing each tire from being locked, the ABS cycle including (i) an ABS processing period of time during which an ABS processing is actually executed, and (ii) a vacant period of time for timing waiting;

DWS processing means for executing an air pressure reduction judgment processing for judging whether or not each tire is reduced in air pressure; and processing control means arranged such that an air pressure reduction judgment processing to be executed by the DWS processing means is dispersively executed in vacant periods of time repeatedly generated by executing ABS processings by the ABS processing means.

2. A tire air pressure reduction detecting apparatus according to claim 1, wherein the apparatus further comprises signal output means for supplying an interrupt signal per ABS cycle, and the processing control means comprises:
means for recognizing the start timing of each vacant period of time;
means for executing, in response to recognition of the start timing of each vacant period of time, an air pressure reduction judgment processing in the DWS processing means; and
means arranged such that, in response to output of an interrupt signal from the signal output means, an air pressure reduction judgment processing under execution in the DWS processing means is temporarily interrupted and an ABS processing is executed in the ABS processing means.

3. A tire air pressure reduction detecting apparatus according to claim 1, further comprising:

initial check processing means for executing an initial check processing for judging whether or not the apparatus functions normally; and means for inhibiting the execution of an air pressure reduction judgment processing by the DWS processing means, during the time which an initial check processing is being executed by the initial check processing means.

4. A tire air pressure reduction detecting apparatus according to claim 1, further comprising memory checking means for checking (i) each memory to be used by the ABS processing means for executing an ABS processing, and (ii) each memory to be used by the DWS processing means for executing an air pressure reduction judgment processing, memory check by the memory checking means being executed according to either an ABS processing program or an air-pressure-reduction-judgment-processing program.

5. A tire air pressure reduction detecting apparatus according to claim 4, wherein an ABS alarm lamp and/or a DWS alarm lamp is lit when it is detected that a memory to be used for an ABS processing, or a memory to be used for an air pressure reduction judgment processing, is defective.

6. A tire air pressure reduction detecting apparatus according to claim 1, wherein the ABS processing means and the DWS processing means share both the memories to be used by the ABS processing means for an ABS processing and the memories to be used by the DWS processing means for an air pressure reduction judgment processing, and are arranged to respectively execute an ABS processing and an air pressure reduction judgment processing.

7. A tire air pressure reduction detecting apparatus according to claim 1, further comprising a plurality of pulse acquiring means each of which is arranged to acquire a wheel rotational velocity pulse corresponding to a rotational angular velocity of each tire mounted on the motor vehicle, the ABS processing means comprising: a plurality of means each of which is arranged to count, in each ABS cycle, the pulse number of a wheel rotational velocity pulse acquired by each pulse acquiring means; a plurality of means each of which is arranged to obtain, for each tire, a pulse interval between pulse-number-counting starting time and pulse-number-counting ending time; a plurality of means each of which is arranged to obtain a rotational angular velocity of each tire based on the pulse number counted in the previous ABS cycle and on the pulse interval obtained in the previous ABS cycle; and means for executing, for the tires, an ABS processing based on the rotational angular velocities thus obtained, the DWS processing means comprising: a plurality of means each of which is arranged to totalize, throughout each DWS cycle, (i) the pulse numbers counted, for each tire, by the ABS processing means and (ii) the pulse intervals obtained, for each tire, by the ABS processing means; a plurality of means each of which is arranged to obtain a rotational angular velocity of each tire based on the pulse number totalized throughout the previous DWS cycle and on the pulse interval totalized throughout the previous DWS cycle; and means for executing, for the tires, an air pressure reduction judgment processing based on the rotational angular velocities thus obtained.

\* \* \* \* \*